(12) United States Patent
Nguyen et al.

(10) Patent No.: US 7,685,265 B1
(45) Date of Patent: Mar. 23, 2010

(54) TOPIC-BASED NOTIFICATION SERVICE

(75) Inventors: Duoc Phuc Nguyen, Renton, WA (US); Suresh Kannan, Redmond, WA (US); Jason Antonelli, Redmond, WA (US); Ramu Movva, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 1108 days.

(21) Appl. No.: 10/718,305

(22) Filed: Nov. 20, 2003

(51) Int. Cl.
*G06F 13/00* (2006.01)

(52) U.S. Cl. ............... 709/223; 709/206; 709/245; 709/238

(58) Field of Classification Search ............ 709/203, 709/206, 245, 223, 238
See application file for complete search history.

(56) References Cited

U.S. PATENT DOCUMENTS

| | | | | |
|---|---|---|---|---|
| 5,557,320 A | * | 9/1996 | Krebs | 709/206 |
| 5,790,790 A | * | 8/1998 | Smith et al. | 709/206 |
| 6,047,327 A | | 4/2000 | Tso et al. | |
| 6,169,897 B1 | * | 1/2001 | Kariya | 455/456.3 |
| 6,345,279 B1 | | 2/2002 | Li et al. | |
| 6,459,913 B2 | | 10/2002 | Cloutier | |
| 6,741,980 B1 | | 5/2004 | Langseth et al. | |
| 6,763,384 B1 | * | 7/2004 | Gupta et al. | 709/224 |
| 6,766,362 B1 | | 7/2004 | Miyasaka et al. | |
| 6,816,878 B1 | | 11/2004 | Zimmers et al. | |
| 6,944,658 B1 | * | 9/2005 | Schneider | 709/203 |
| 6,980,993 B2 | | 12/2005 | Horvitz | |
| 7,133,869 B2 | | 11/2006 | Bryan et al. | |
| 7,143,118 B2 | | 11/2006 | Eichstaedt et al. | |
| 7,207,008 B1 | * | 4/2007 | Koch | 715/736 |
| 7,502,384 B2 | * | 3/2009 | Trossen et al. | 370/466 |
| 2001/0044275 A1 | | 11/2001 | Yamaguchi | |
| 2002/0032790 A1 | * | 3/2002 | Linderman | 709/230 |
| 2002/0042846 A1 | | 4/2002 | Bottan et al. | |
| 2002/0073158 A1 | | 6/2002 | Dalal et al. | |
| 2002/0080948 A1 | | 6/2002 | Canali et al. | |
| 2002/0087397 A1 | | 7/2002 | Mazza | |
| 2002/0087740 A1 | | 7/2002 | Castanho et al. | |
| 2002/0090934 A1 | | 7/2002 | Mitchelmore | |
| 2002/0107985 A1 | | 8/2002 | Hwang et al. | |
| 2002/0120711 A1 | * | 8/2002 | Bantz et al. | 709/217 |
| 2002/0124182 A1 | | 9/2002 | Bacso et al. | |
| 2002/0184092 A1 | | 12/2002 | Cherry et al. | |
| 2003/0055897 A1 | | 3/2003 | Brown et al. | |
| 2003/0097485 A1 | | 5/2003 | Horvitz et al. | |
| 2003/0100326 A1 | * | 5/2003 | Grube et al. | 455/515 |
| 2003/0101190 A1 | * | 5/2003 | Horvitz et al. | 707/100 |

(Continued)

OTHER PUBLICATIONS

Wang et al., "The SIMBA User Alert Service Architecture for Dependable Alert Delivery," Proceedings of the International Conference on Dependable Systems and Networks, 2001, pp. 463-472, Institute of Electrical and Electronics Engineers, Inc., U.S.A.

(Continued)

*Primary Examiner*—Kenneth R Coulter
(74) *Attorney, Agent, or Firm*—Senniger Powers LLP

(57) ABSTRACT

Methods and systems for managing notifications. A web service embodying aspects of the invention is responsive to requests structured according to an extensible messaging framework and extracts request information, including at least a content provider identifier and a topic identifier, from the request to execute a selected notification management function.

29 Claims, 12 Drawing Sheets

U.S. PATENT DOCUMENTS

| | | |
|---|---|---|
| 2003/0120785 A1 | 6/2003 | Young |
| 2003/0131073 A1 | 7/2003 | Lucovsky et al. |
| 2003/0131142 A1 | 7/2003 | Horvitz et al. |
| 2003/0135556 A1 | 7/2003 | Holdsworth |
| 2003/0223449 A1* | 12/2003 | Hill et al. .................... 370/433 |
| 2004/0002972 A1 | 1/2004 | Pather et al. |
| 2004/0181550 A1 | 9/2004 | Warsta |
| 2005/0027741 A1 | 2/2005 | Eichstaedt et al. |
| 2005/0144266 A1 | 6/2005 | Antonelli et al. |
| 2006/0133385 A1* | 6/2006 | Trossen et al. ......... 370/395.52 |
| 2007/0198691 A1* | 8/2007 | Koch .......................... 709/223 |

OTHER PUBLICATIONS

Miller et al., "News On-Demand for Multimedia Networks," Proceedings of the First ACM International Conference on Multimedia, 1993, pp. 383-392, ACM Press, New York, U.S.A.

Faensen et al., "Hermes: A Notification Service for Digital Libraries," Proceedings of the First ACM/IEEE-CS Joint Conference on Digital Libraries, 2001, pp. 373-380, ACM Press, New York, U.S.A.

Huang et al., "Publish/Subscribe in a Mobile Environment," Second ACM International Workshop on Data Engineering for Wireless and Mobile Access, 2001, pp. 27-34, ACM Press, New York, U.S.A.

Nielsen et al., "Web Services Routing Protocol (WS-Routing)," printed from http://msdn.micfosoft.com/library/en-us/dnglobspe/html/ws-routing.asp?frame=true, Oct. 23, 2001, 25 pages.

* cited by examiner

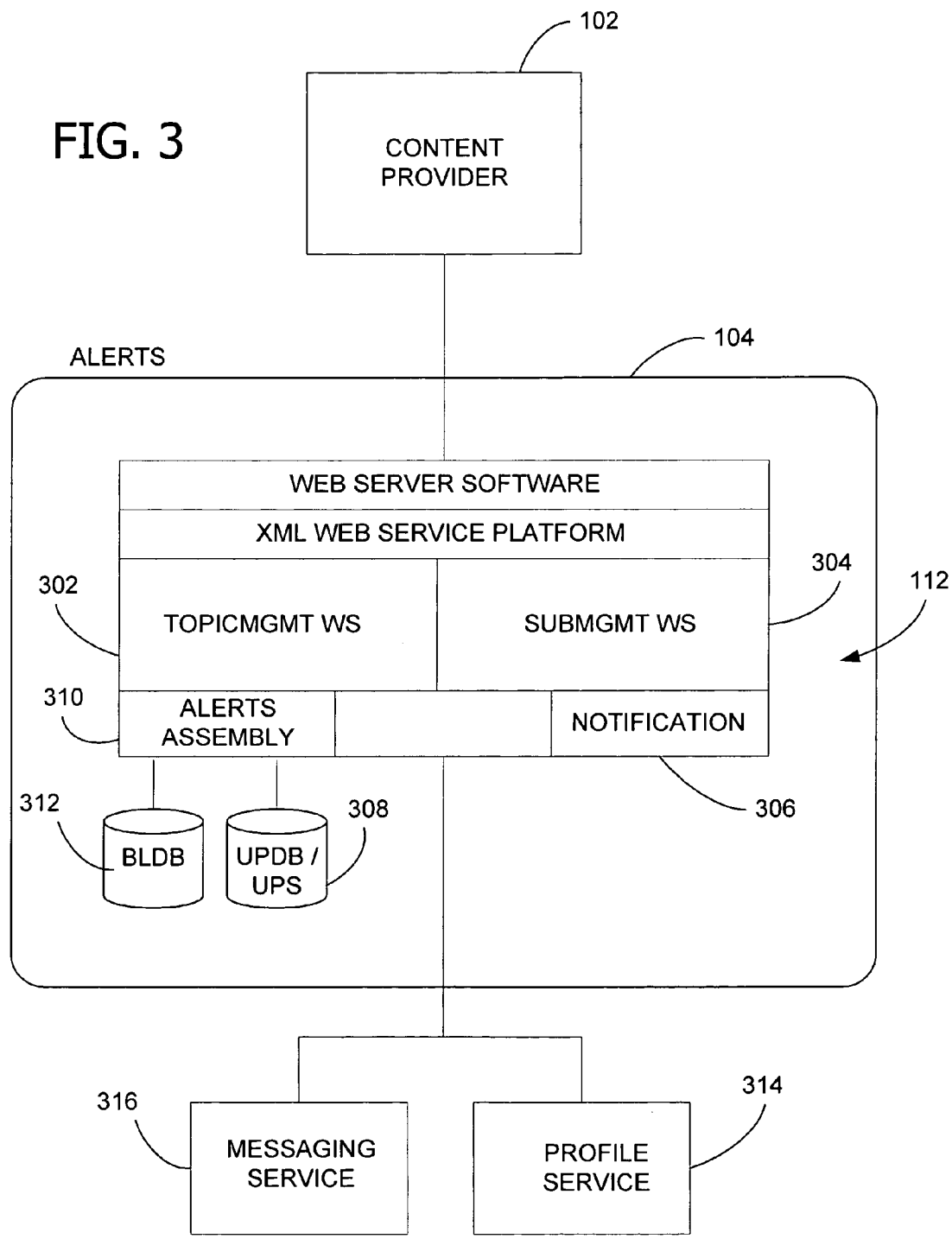

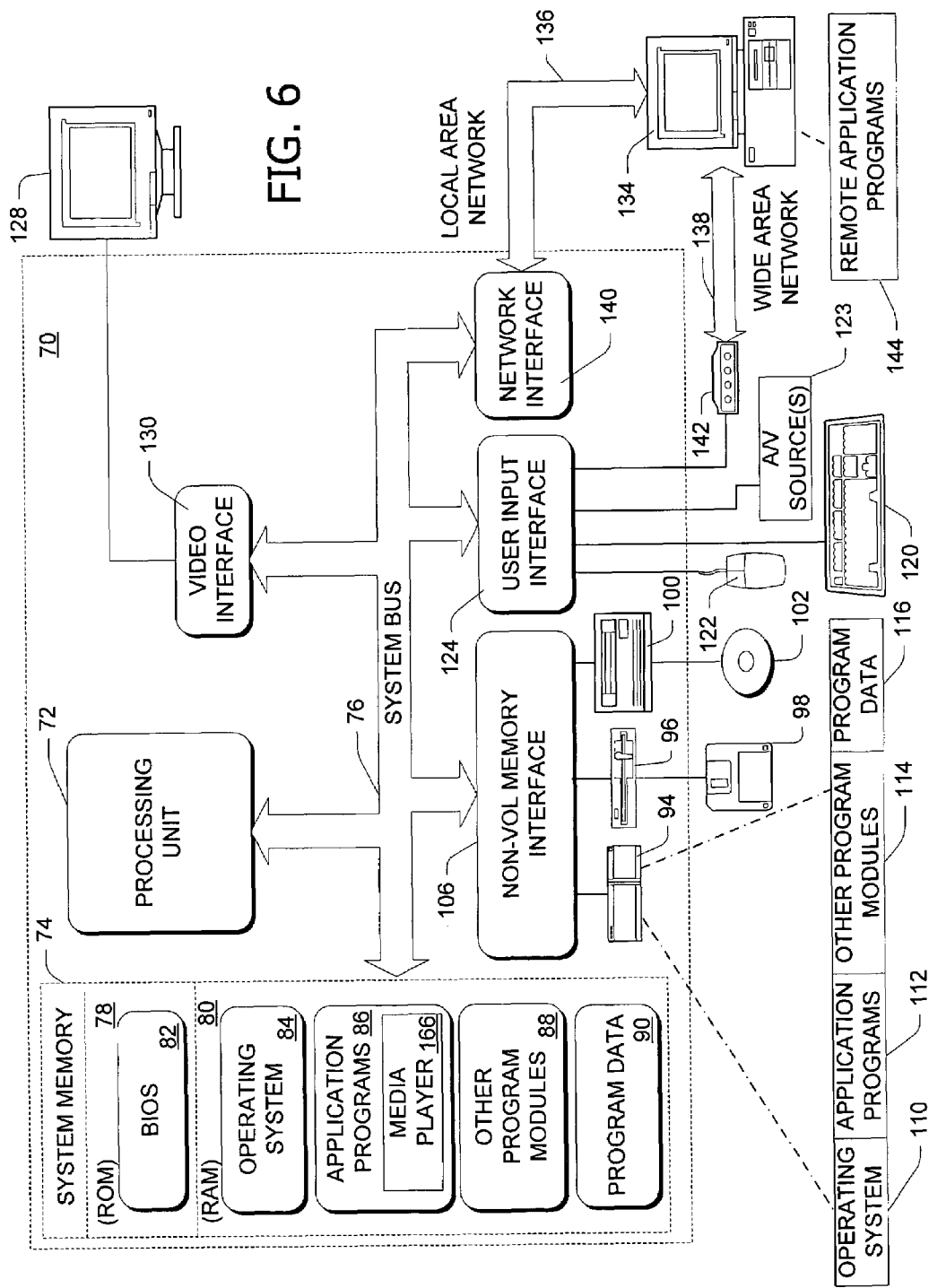

TOPIC-BASED NOTIFICATION SERVICE

TECHNICAL FIELD

Embodiments of the present invention relate to the field of software notifications. In particular, embodiments of this invention relate to implementing an extensible messaging framework in a web service for managing notifications.

BACKGROUND OF THE INVENTION

Up-to-date information in a wide variety of areas is very important to many people. These people often desire to be alerted to time-sensitive events and information. Content providers generate content for notifications, which are then delivered to one or more user electronically (e.g., via electronic mail). For example, a news organization may provide notification content relating stock prices, breaking news, weather conditions, traffic conditions, etc. A user's expressed interest to receive electronic notifications for a particular class of content is generally called a notification subscription. Such subscriptions often are made between the end user and the content provider that sends the notifications. Event-driven notifications of this type are often referred to as alerts.

A notification generally consists of two parts: (i) the routing/address information; and (ii) the message payload. However, different alert notification systems can have different protocols particular to the individual system. Information or content providers must then tailor the notifications to the particular systems, which complicates the delivery and management of notifications.

Accordingly, a generalized notification mechanism that allows for greater interoperability across different systems is desired to address one or more of these and other disadvantages.

SUMMARY OF THE INVENTION

Embodiments of the invention overcome one or more deficiencies in the prior art by providing a programming model for managing notification-based applications. In one embodiment, the invention implements protocols based on an extensible messaging framework such as Simple Object Access Protocol (SOAP). As such, the protocols allow for greater interoperability across disparate systems. The design of these protocols has many provisions for extensibility, which allows notification-based applications in many domains to employ the protocols as the programming model.

A web-based notifications service embodying aspects of the invention serves as an intermediary between content providers and end users. In this instance, the protocols are geared towards synchronizing the subscriptions information of the intermediary along with the publisher or content provider. Embodiments of the invention facilitate and maintain a topic web service to gather minimal information necessary to enable intelligent routing rules rather than requiring that information needed for advanced routing is present in each notification packet sent by the content provider.

The invention relieves content providers of the need to tailor the notifications to the particular systems. In one embodiment, the invention provides a generalized notification mechanism (e.g., encompassed by a SOAP-based notification protocol) that allows for greater interoperability across different systems. Content providers can more easily program their systems to send notifications.

Moreover, the features of the present invention described herein are less laborious and easier to implement than currently available techniques as well as being economically feasible and commercially practical.

Briefly described, a method embodying aspects of the invention manages notifications in a web-based notifications system. The notifications system is configured to provide notifications containing content provided by a content provider to a user via a data communication network. The content relates to one or more topics. The method includes implementing a web service responsive to requests structured according to an extensible messaging framework. The method also includes receiving, at the web service, a request from a content provider. The request specifies a selected notification management function and is structured according to the messaging framework. The method also includes extracting request information, including at least a content provider identifier and a topic identifier, from the request and executing the selected notification management function based on the extracted request information.

In another embodiment, a method for managing notifications in a web-based notifications system includes implementing a web service responsive to requests structured according to an extensible messaging framework. The method also includes receiving, at the web service, a request structured according to the messaging framework from a content provider and extracting request information from the request. The request information includes at least a content provider identifier, a topic identifier, and a user identifier. The method further includes querying a user profile store for profile information corresponding to the user identifier, determining routing information for a notification based on the profile information, and creating a subscription corresponding to the topic identifier, the user identifier, and the routing path for the notification.

Yet another embodiment of the invention relates to a web-based system for processing notifications. The notifications contain content relating to one or more topics provided by one or more content providers. The system includes a computing device to implement a web service responsive to requests structured according to an extensible messaging framework. The computing device is coupled to a data communication network and configured to receive a request from a content provider via the data communication network. The request from the content provider specifies a selected notification management function. The request is structured according to the messaging framework. The system also includes a computer-readable medium that stores computer-executable instructions to be executed on the computing device to extract request information from the request. The information includes a content provider identifier and a topic identifier associated with the request and to perform the selected notification management function based on the extracted request information. The system further includes a memory associated with the computing device to store the extracted request information in connection with the selected notification management function.

Another web-based system for processing notifications embodying aspects of the invention includes a computing device to implement a web service responsive to requests structured according to an extensible messaging framework. The computing device is coupled to a data communication network and configured to receive a request from a content provider via the data communication network. The system also includes a user profile store that is associated with the computing device to store information representative of a plurality of users and a computer-readable medium that stores computer-executable instructions to be executed on the computing device to extract request information from the request.

The request information includes a content provider identifier, a topic identifier, and a user identifier associated with the request, to query the user profile store for profile information corresponding to the user identifier, to determine routing information for a notification based on the profile information, and to create a subscription corresponding to the topic identifier, the user identifier, and the routing path for the notification.

In yet another embodiment, a web service that manages notifications in a web-based notifications system includes a computing device to implement the web service. The computing device is coupled to the data communication network and configured to receive requests structured according to an extensible messaging framework from one or more content providers via the data communication network. The service also includes a computer-readable medium that stores computer-executable instructions to be executed on the computing device to provide the extensible messaging framework to the content providers to create requests. The requests when structured according to the messaging framework each specify a selected notification management function and contain request information. The request information for each of the requests includes a content provider identifier and a topic identifier associated therewith. The computer-readable medium further stores computer-executable instructions to be executed on the computing device to extract the request information for each of the requests and to perform the selected notification management function based on the extracted request information.

Computer-readable media having computer-executable instructions for performing methods of notifications management embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 3 is an exemplary block diagram illustrating a detailed view of the alerts service illustrated in FIG. 1.

FIG. 6 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
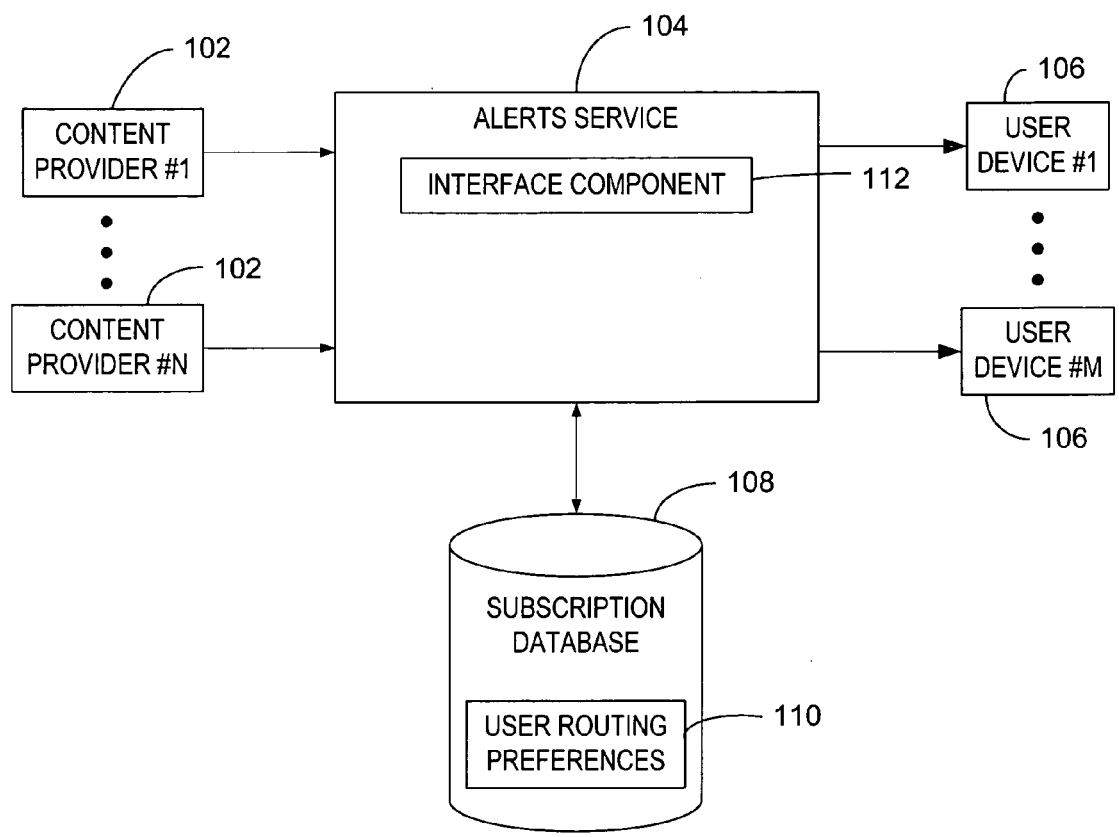
FIG. 1 is a block diagram illustrating one example of a suitable alerts service environment in which the invention may be implemented.

Referring first to FIG. 1, an exemplary block diagram illustrates one example of a suitable alerts service environment in which the invention may be implemented. FIG. 1 illustrates the communication flow between a content provider 102 such as content provider #1 through content provider #N, an alerts service 104, and a user device 106 such as user device #1 through user device #M. The content provider 102, the alerts service 104, and the user device 106 are coupled to a data communication network such as described with reference to FIG. 6. The content provider 102 sends a notification to the alerts service 104 for delivery to one or more of the user devices 106. Alerts service 104 accesses a subscription database 108 storing subscription information and user routing preferences 110 to determine which user device(s) 106 should receive the alert. Alerts service 104 then delivers the alert to the determined user device 106. In one example, the alerts service environment is referred to as a notification pipeline and database (NPD).

The alerts service 104 illustrated in FIG. 1 transcends any one particular transport medium for delivery of notifications. The invention may use any of a plurality of transport mediums such as electronic mail, instant messaging, mobile short-message-service messaging, wireless communications, etc.

Aspects of the present invention provide a generalized notification mechanism for greater interoperability across different systems. In general, a web-based notifications system (i.e., alerts service 104) operating in accordance with embodiments of the invention sends a message, often referred to as a notification or alert, to a subscribing user via his or her specified user device 106. The message contains event-driven information from content provider 102 relevant to a topic of interest to which the user has signed up. In other words, a subscriber is a user or other entity that expresses an interest in a topic and receives notifications related to the topic from content provider 102. In one embodiment, the combination of a subscriber and a topic constitutes a subscription. Exemplary topics for alerts include news, weather, sports, finance, traffic, hobbies, bargains, and so forth. As described above, the notifications are usually driven by events such as breaking news, changes in weather or traffic conditions, auction outbid notices, etc.

The invention includes protocols for notification-based applications, which center on generating and sending notifications. In one embodiment, a set of protocols for this class of applications is based on Simple Object Access Protocol (SOAP). The protocols provide the basis for a programming model for managing notification-based applications and serve as building blocks for a platform for such applications. Inasmuch as the protocols are based on SOAP, for example, they allow for greater interoperability across disparate systems. The design of these protocols has many provisions for extensibility, which allows notification-based applications in many domains to employ the messaging framework of the invention as the programming model.

Notification-based applications may also be referred to as publisher/subscriber applications. In this instance, subscribers create subscriptions for the topics of interest to them. When an event occurs, a notification-based application matches the topic corresponding to the event with the subscriptions. The notification system then sends the appropriate notification to each subscriber for the matches.

Referring further to FIG. 1, alerts service 104 processes notification or alert information received via the data communication network from content provider 102. An interface component 112 receives a data packet representing the notification and alerts service 104 stores it in a memory area. In one example, the memory area includes a plurality of databases (not shown). The notification includes routing information and content. One or more computing devices associated with the alerts service 104 enable delivery of the stored notification to one or more subscribing users based on the routing information.

The user device 106 may be a computer such as computer 70 described with reference to FIG. 6. Further, user device 106 may execute an alerts application (e.g., an instant messaging application) that receives and processes alerts. The alerts application executes on user device 106, which may also be, for example, a cellular telephone (e.g., a Smartphone device), a pager, or a handheld computing device (e.g., a personal digital assistant or a Pocket PC device). Moreover, user device 106 may include any of the above exemplary devices enabled with an information service such as a SMART PERSONAL OBJECTS TECHNOLOGY (SPOT) brand of telecommunication service and/or devices. The information service comprises a computing infrastructure (e.g., a telecommunication service) for sending data and information to personal and home devices via computer networks, wireless networks and the Internet. User devices 106 that may be enabled with the information service include, but are not limited to, the following devices: clocks, alarm clocks, radios incorporating clocks, watches, billfolds, wallets, checkbook and passbook wallets, purses, pens, metal key rings, key holders, wireless devices, computer hardware (e.g., peripherals, monitors, and displays), electronic calendar devices, and refrigerator magnets. Further, magazines, books, and user manuals relating to computers, computer programs, personal information devices and wireless communications may also incorporate the information service. The information service enables billions of devices to communicate with each other. For example, customers select the type of information and services they want to receive on the enabled devices via a configuration web page. This content is subsequently beamed to and displayed on the device. Information available to users on devices using the information service includes personal messages, calendar updates, and customized news, weather, financial and sports information.

In one embodiment, the system shown in FIG. 1 is implemented as a web service and functionality associated with alerts service 104 may be distributed among one or more computers. For example, alerts service 104 may include a distributed processing system. When content provider 102 posts an alert such as in the form of an extensible markup language (XML) document, alerts service 104 parses the alert and validates the packet. Alerts service 104 may also asynchronously process the alert by queuing it into an NPD queue or other memory area. The NPD queue represents an internal queue of work items that are acted upon by any one of the multiple threads in the thread pool, but only one thread processes the item at any given time. The alerts service 104 then retrieves information regarding, for example, a specific broadcast list specified in the alert, such as the number of members or users, and an internal 32-bit row identifier from a database such as a broadcast list database (BLDB) (see FIG. 3).

Figure 2:
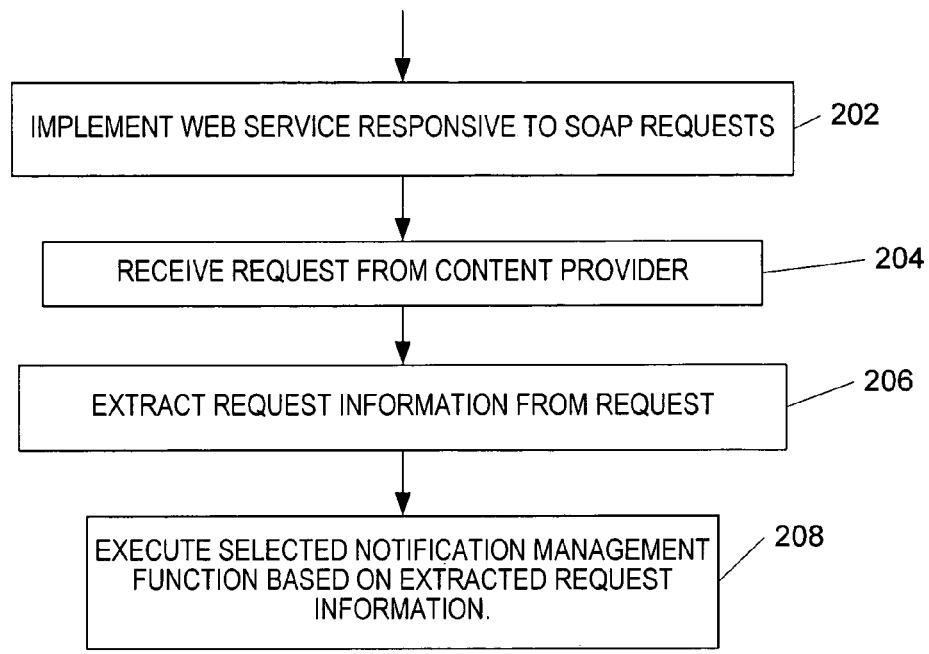
FIG. 2 is an exemplary flow diagram illustrating operation according to one embodiment of the invention.

Referring next to FIG. 2, an exemplary flow chart illustrates operation of alerts service 104. One or more computer-readable media have computer-executable instructions for performing the method illustrated in FIG. 2. The invention software or other computer-executable instructions implements a web service responsive to requests structured according to an extensible messaging framework (e.g., SOAP) at 202. In the SOAP example, content provider 202 sends a SOAP request to the web service (e.g., an alerts topic management web service as shown in FIG. 3). At 204, the web service receives a request from content provider 102. In this embodiment, the request specifies a selected notification management function, such as creation or deletion of a topic or enumeration of topics. The request is structured according to the messaging framework. At 206, request information is extracted from the request. The request information in the illustrated embodiment includes at least a content provider identifier CPID and a topic identifier TopicID. Other request information may include a topic name and a topic language. Alerts service 104 extracts the CPID from, for example, a header of the SOAP request. As part of the generalized messaging framework, embodiments of the invention create a response object in response to the received request. The response object is also structured according to the messaging framework and contains information regarding the success or failure of the request. Computer-executable instructions at 208 call for executing the selected notification management function (e.g., creation or deletion of a topic) based on the extracted request information.

Referring now to FIG. 3, alerts service 104 hosts an implementation of protocols for notification-based applications as web services to which content providers 102 may program using the protocols. In the illustrated embodiment, alerts service 104 includes a topic management web service 302 and a subscription management web service 304. The topic management web service 302 implements a topic management protocol to allow the creation, updating, and enumeration of topics. Similarly, the subscription management web service 304 implements a subscription management protocol according to embodiments of the invention to allow content provider 102 to create, delete, or update subscriptions. Although described separately, the topic management service 302 and the subscription management service 304 may be implemented together. Another component of alerts service 104, namely, a notification web service 306, allows content providers 102 to submit notifications for delivery to subscribers.

A web services component (e.g., an ASP.NET web service), for example, embodies subscription management web service 304. The subscription management service 304 of FIG. 3 manipulates a user profile database (UPDB) or user profile store (UPS) 308 with, for example, a .NET dynamic-link library (DLL) assembly 310, to obtain information regarding the subscribing user based on the notification information received from content provider 102. The web service 304 further accesses the UPDB or UPS 308, a BLDB 312, a profile service 314, an instant messaging service 316, and the notification web service 306. As an example, MSN® Messenger or .NET™ Messenger provides a suitable instant messaging service 316 for use in connection with the invention. Also, a multi-site user authentication system, such as Microsoft®.NET™ Passport single sign-in service, is suitable for the profile service 314.

According to embodiments of the invention, messaging service 316 is one of the endpoints to which alerts service 104 can deliver notifications. When a user signs up to receive notifications through alerts service 104, the user specifies whether he or she wants to receive notifications through messaging service 316. When the user signs up to receive notifications with respect to some content change (e.g., stock/news), he or she specifies information about how the notifications are to be routed. In this instance, the routing information is captured in UPS 308 as well. When notification web service 304 receives a notification that needs to be delivered, it looks up the routing information in UPS 308 and delivers it the appropriate endpoints. Messaging service 316 is one exemplary endpoint.

In one embodiment of the invention, subscription information in alerts service 104 is stored in the user profile service and in a broadcast list database (e.g., UPDB/UPS 308 and BLDB 312, respectively). When an affiliated content provider 102 sends a subscription management request to subscription management web service 304, the web service implementation queries/updates the information in UPDB/UPS 308 and BLDB 312.

Advantageously, the web service implemented by alerts service 104 takes the load off of subscription mirroring because the SOAP variant is less user interface intensive. Based on this service profile, one embodiment of the invention calls for a deployment scenario of running the web service on the web front ends. A throttling mechanism may be implemented in the web service to assert that the web service does not bog down the user interface.

Figure 4A:
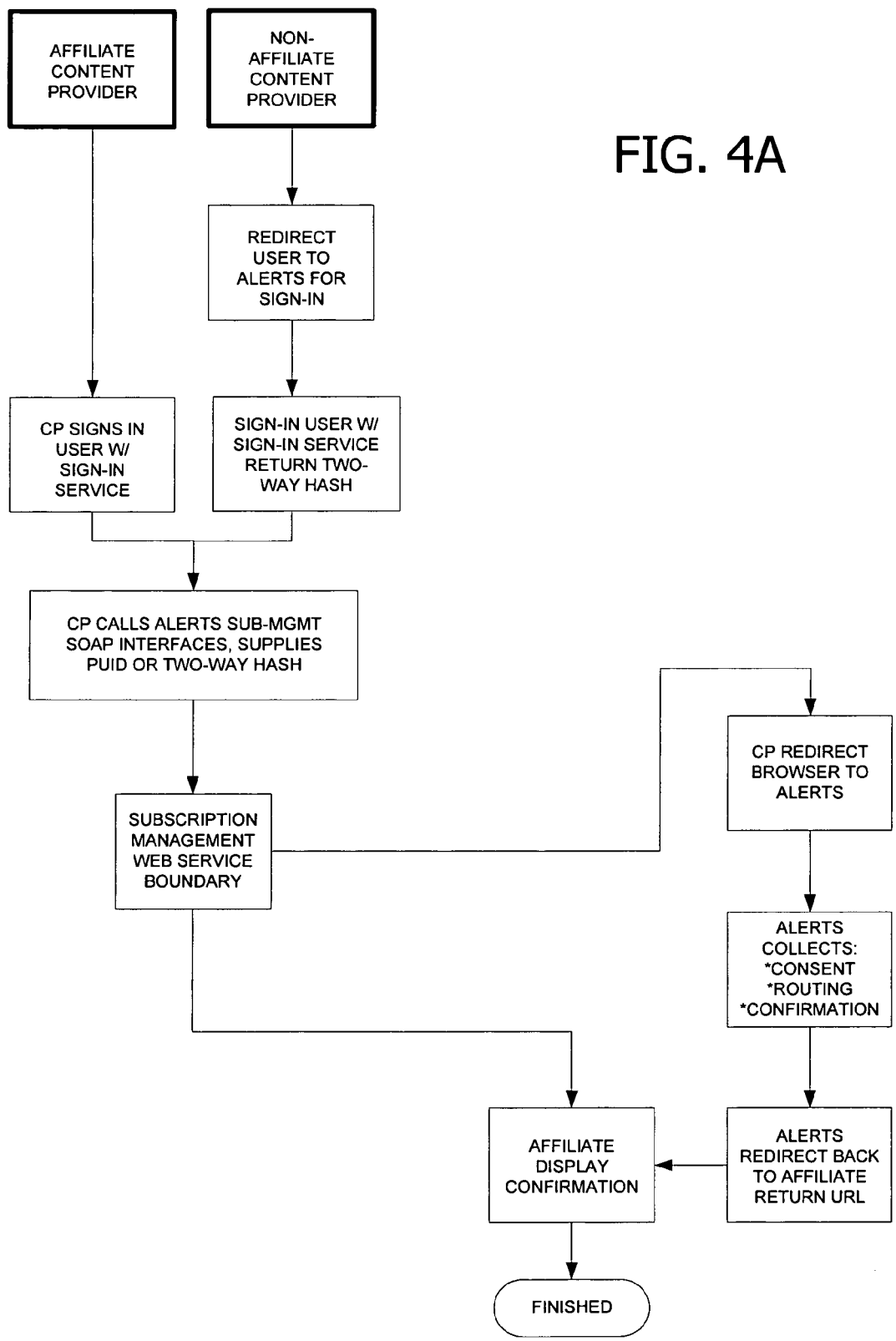
FIGS. 4A to 4C are each portions of an exemplary flow diagram illustrating operation of a subscription management web service according to one embodiment of the invention.
Figure 4B:
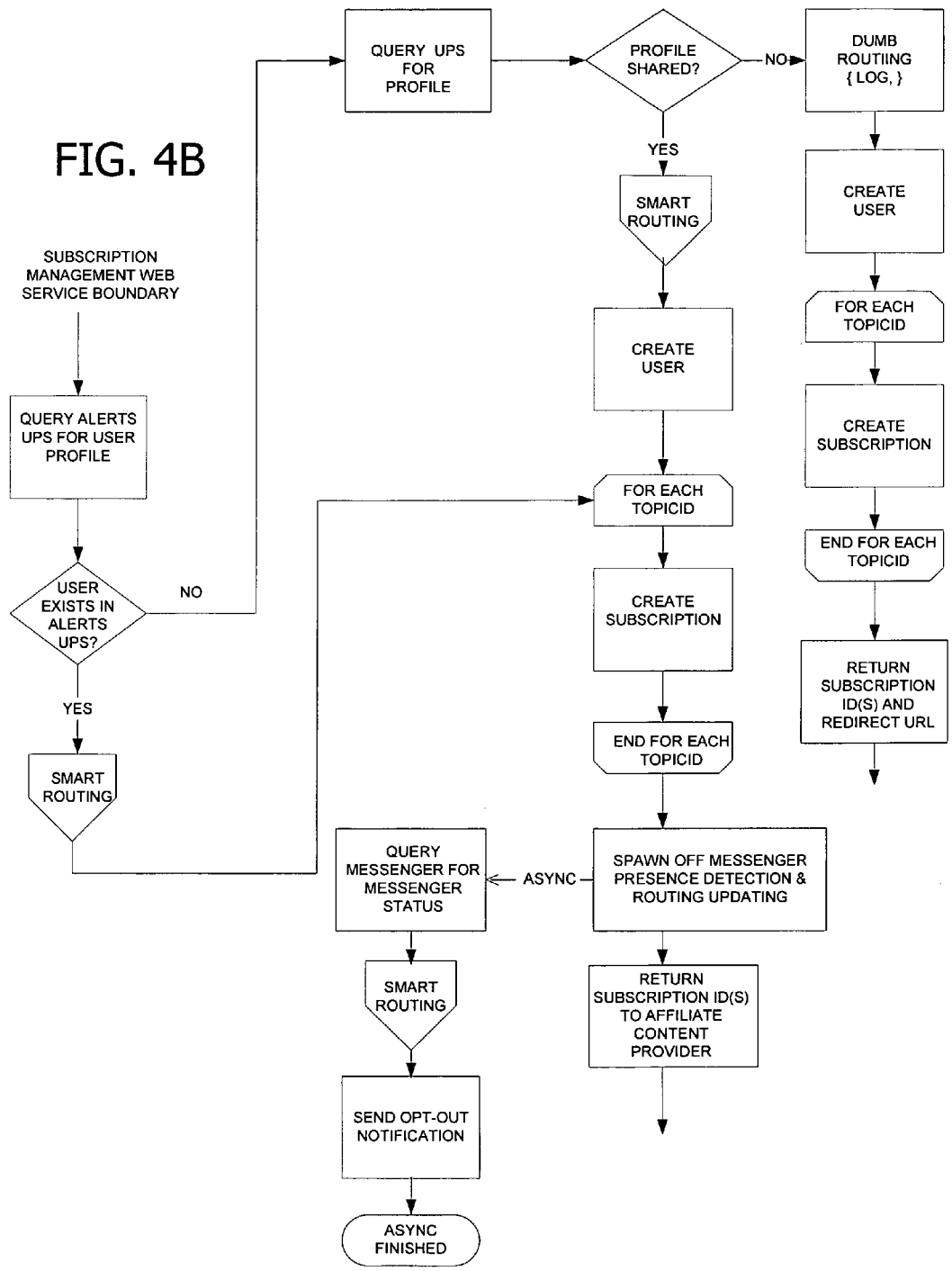
Figure 4C:
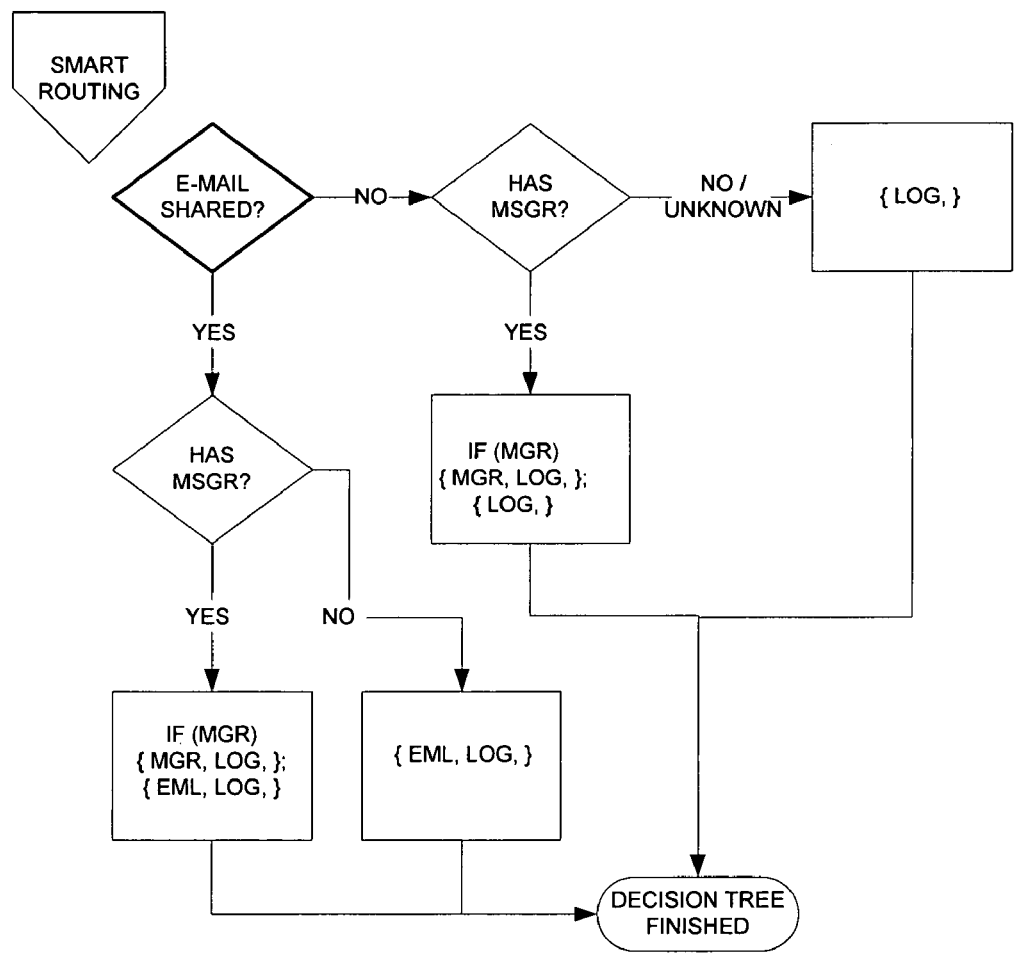

FIGS. 4A-4C illustrate operations of subscription management web service 304 in an exemplary flow diagram. The subscription management web service 304 allows content provider 102 to manage its own set of subscriptions and allows alerts service 104 to manage an end user's subscriptions. Key functions include: Subscribe an end user to a topic (a topic is a broadcast list or dynamic assignment); Unsubscribe an end-user from a topic; Update a set of subscriptions; Enumerate subscriptions; Create a topic; Update a topic; and Enumerate topics.

In general, FIG. 4A illustrates an exemplary sign-in process for content provider 102. Following sign-in, the invention in this embodiment executes a web service boundary for subscription management. Depending on the outcome of the boundary function, alerts service 104 collects consent, routing, and confirmation information. FIG. 4B is an exemplary flow diagram illustrating aspects of the subscription management web service boundary. In general, alerts service 104 implements the web service responsive to requests structured according to an extensible messaging framework such as SOAP. Alerts service 104 queries a user profile store (e.g., UPS 308) for profile information corresponding to a user identifier (e.g., PUID) extracted from the request. Based on profile information returned by the query, alerts service 104 further determines routing information for the notification. In turn, the invention in this example performs a selected management function such as creating a subscription for each TopicID in the request message. FIG. 4C provides additional detail regarding smart routing to determine the routing information for the notification. Additional aspects of FIGS. 4A to 4C will be described with reference to FIGS. 5A to 5E.

Figure 5A:
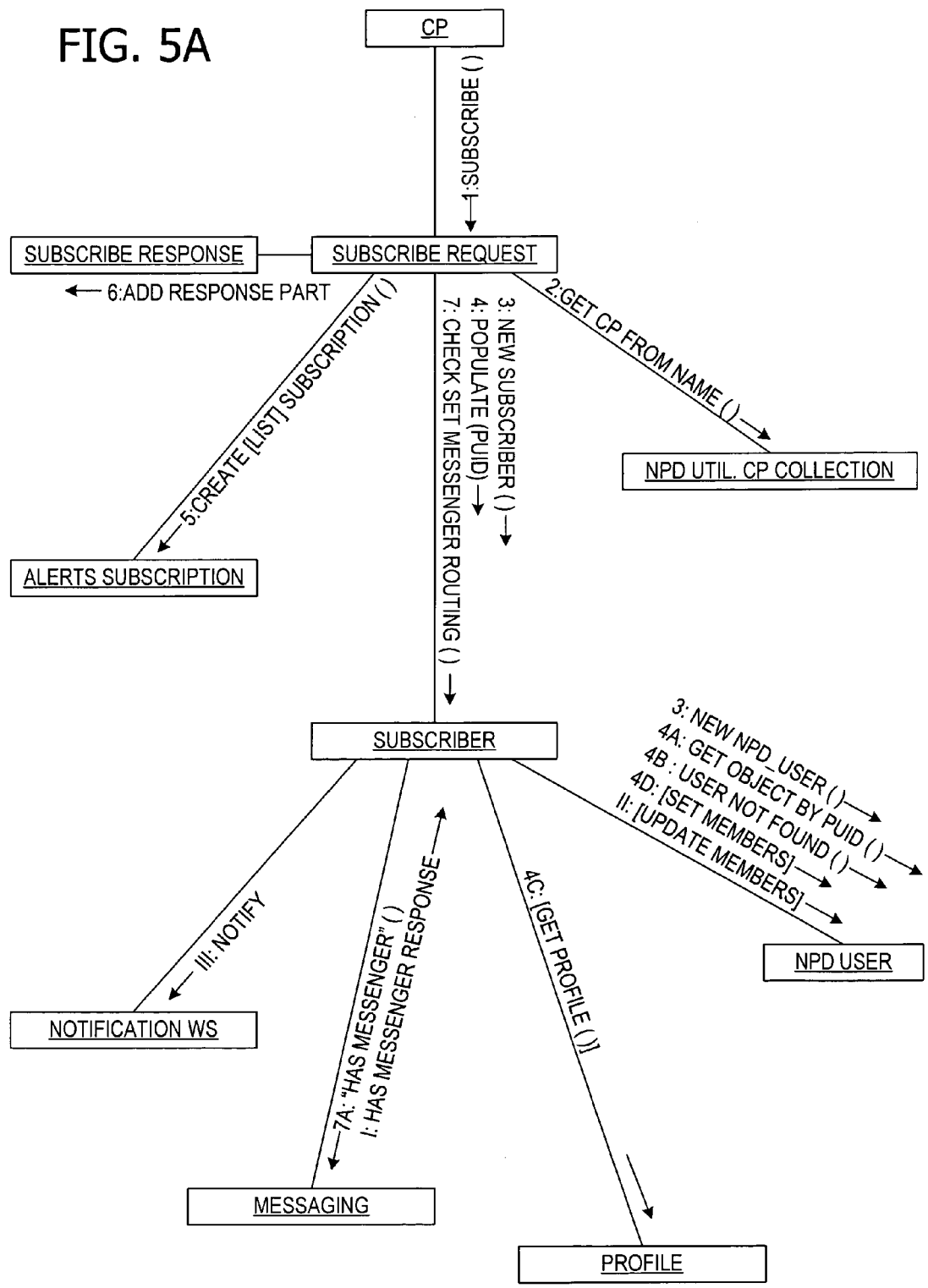
FIGS. 5A to 5E are each exemplary flow diagrams illustrating aspects of operation of a subscription management web service and topic management web service according to embodiments of the invention.

FIG. 5A is an exemplary flow diagram of a selected management function of creating a subscription (i.e., Subscribe). The flow diagram shows a sequence of major function calls between the objects for creating a subscription. 1) Content provider 102 posts a Subscribe Request; 2) the CPID context is retrieved, given the CPID field in the protocol matched with the username from the digest authentication; and 3) a Subscriber object is created (inherits from NPD_User). Continuing at 4) the PUID is used to make sure the profile data exists in UPDB/UPS 308 by a) trying to get the subscriber from the UPDB/UPS 308, b) checking if the subscriber was not found, c) if he or she was not found, getting the profile from a multi-site authentication system (e.g., profile service 314, and d) setting the members in the NPD_User, setting up routing (see table below), and filling in the profile in UPDB/UPS 308. Proceeding to 5) depending on the topic, either a new subscription or a new subscription in a broadcast list is created, noting the timestamp for each subscription; 6) depending on outcome, some result is added to the SubscribeResponse; and 7) the Subscriber object is used to make an asynchronous call to messaging service 316 to hopefully get some additional data for a smarter routing for the created subscriptions. This may not complete until the SOAP session is done. The UPS timestamp is checked to verify that the user has not manually changed the routing settings. Steps 5-6 are repeated for each topic in the request, after which the response is returned. If, at 4c), it turns out the user does not have a profile at profile service 314, a Redirect element is added to the SubscribeResponse. When the I/O Completion call, at 6a), has ended and returns with a callback, the following occurs: I) (Callback); II) The member data is updated in UPDB/UPS 308; and III) an opt-out message may be sent.

With respect to smart routing (see FIG. 4C), the following table show the various routing cases:

| # | UPDB/UPS User exists | Profile E-mail shared | Messaging service | Action |
| --- | --- | --- | --- | --- |
| 1 | Yes | n/a | n/a | Use existing routing |
| 2 | No | Yes | No Mgr | {Eml,Log,} [10] |
| 3 | No | Yes | Mgr | if (Mgr) {Mgr,Log,}; {Eml,Log,} [40] |
| 4 | No | No | No Mgr | { Log, }; [2] |
| 5 | No | No | Mgr | if (Mgr) {Mgr,Log,}; {Log,} [33] |

The synchronous logic is:
If the user exists in UPDB/UPS
  Use the best routing according to #2-#5 using UPDB/UPS data
  Send an opt-out notification
Else
  If the user has a profile
    If an email address is shared from the profile
      Set routing to {Eml, Log,}
      Note the need to check with messaging service
    Else
      Set routing to {Log,}
        Add the Redirect part to the response
      Note the need to check with messaging service
  Else
    Erroneous PUID!

Figure 5B:
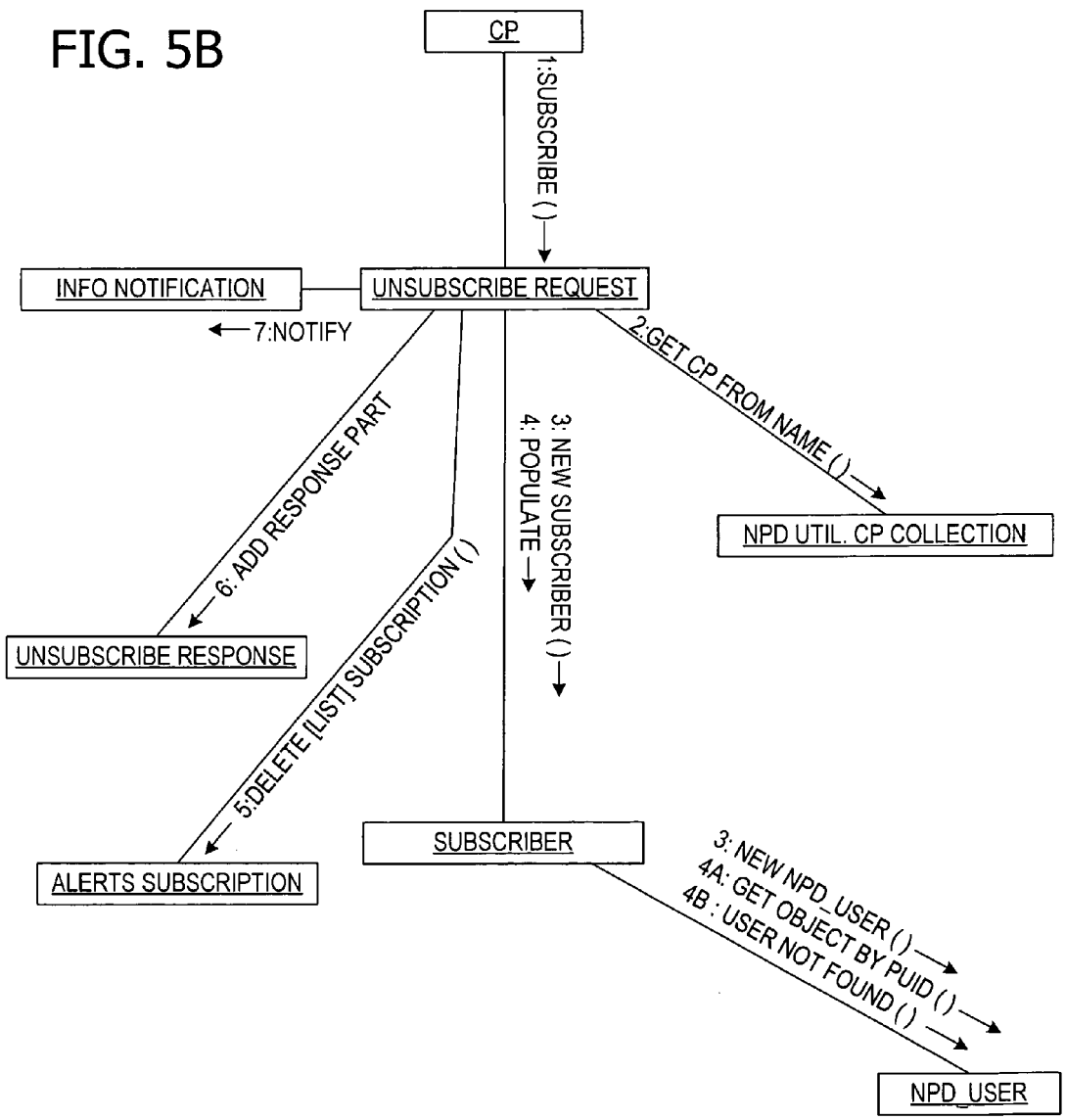

If checking for presence via messaging service 316, an async request is performed to deliver a notification to messaging service 316 and look at the return code. The notification will either be an empty message or the opt-out notification. Once the request has been handled, a callback to the web service will be received. The logic of that callback is:
  If the user uses messaging service
    If we have the email address in the database
      Update the routing to if (Mgr) {Mgr, Log,}; {Eml, Log,}
    Else
      Update the routing to if (Mgr) {Mgr, Log,}; {Log,}
  Else
    // The routing is already set as good as is possible FIG. 5B is an exemplary flow diagram of a selected management function of deleting a subscription (i.e., Unsubscribe). 1) Content provider 102 posts an Unsubscribe Request; 2) the CPID context is retrieved, given the username from the Digest authentication; 3) a Subscriber object is created; 4) the actual data is retrieved from the PUID, giving the ID and Bucket; 5) the subscription is deleted; 6) depending on outcome, some result is added to the SubscribeResponse; and 7) a notification is sent to the user, telling him or her of the action. Steps 5-6 are repeated for each topic in the request, after which the response is returned.

Figure 5C:
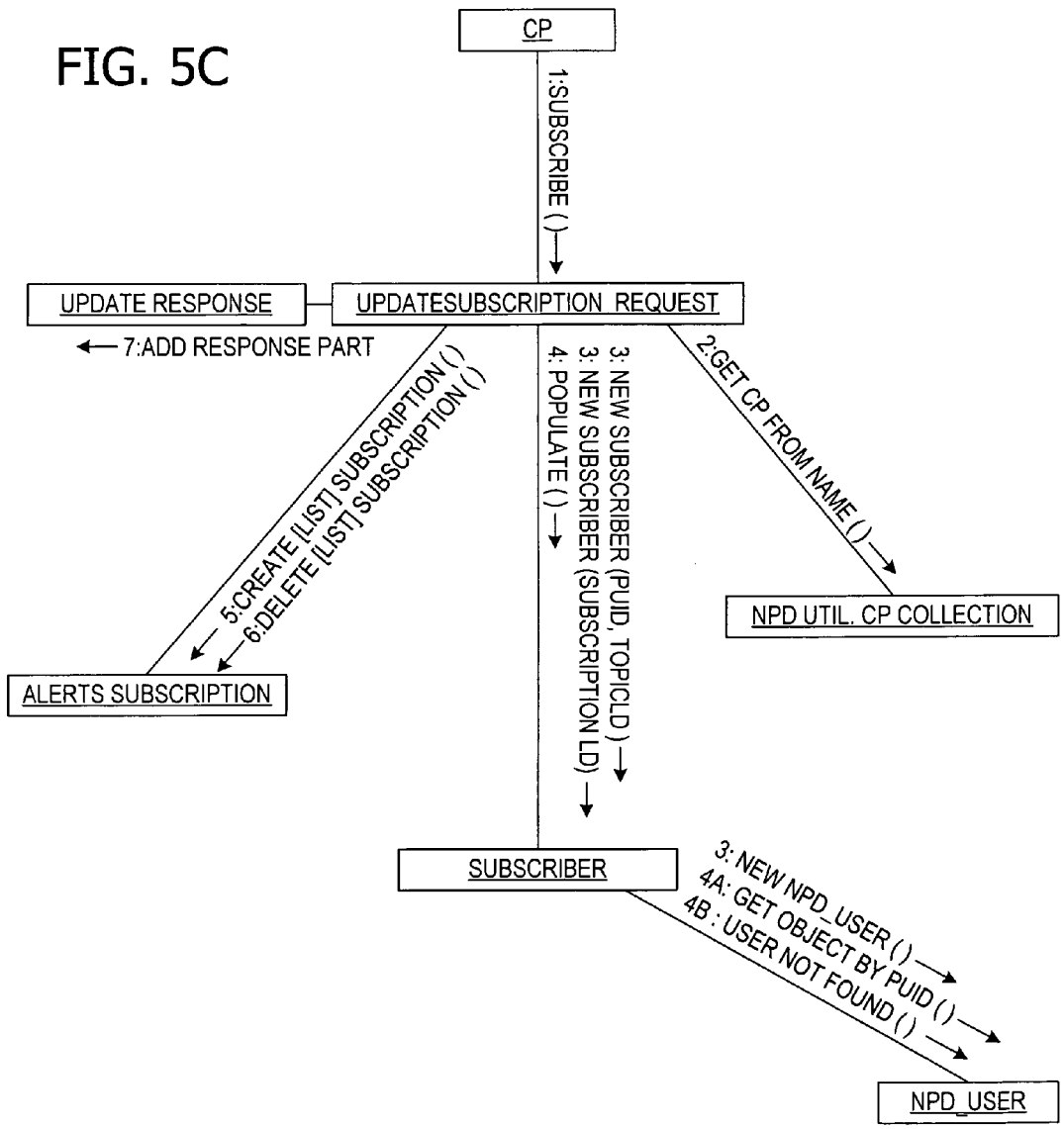

FIG. 5C is an exemplary flow diagram of a selected management function of updating a subscription (i.e., Update Subscriptions). 1) Content provider 102 posts an Update Subscriptions Request; 2) the CPID context is retrieved; 3) a Subscriber object is created (this provides a translation between {PUID, TopicId} and SubscriptionId); 4) the Subscriber is populated from UPDB 308; 5) the new subscription is created; 6) the old subscription is deleted, if step 5 succeeded; and 7) a response part is added to the response. Steps 3-6 are repeated for each specified subscriber.

Figure 5D:
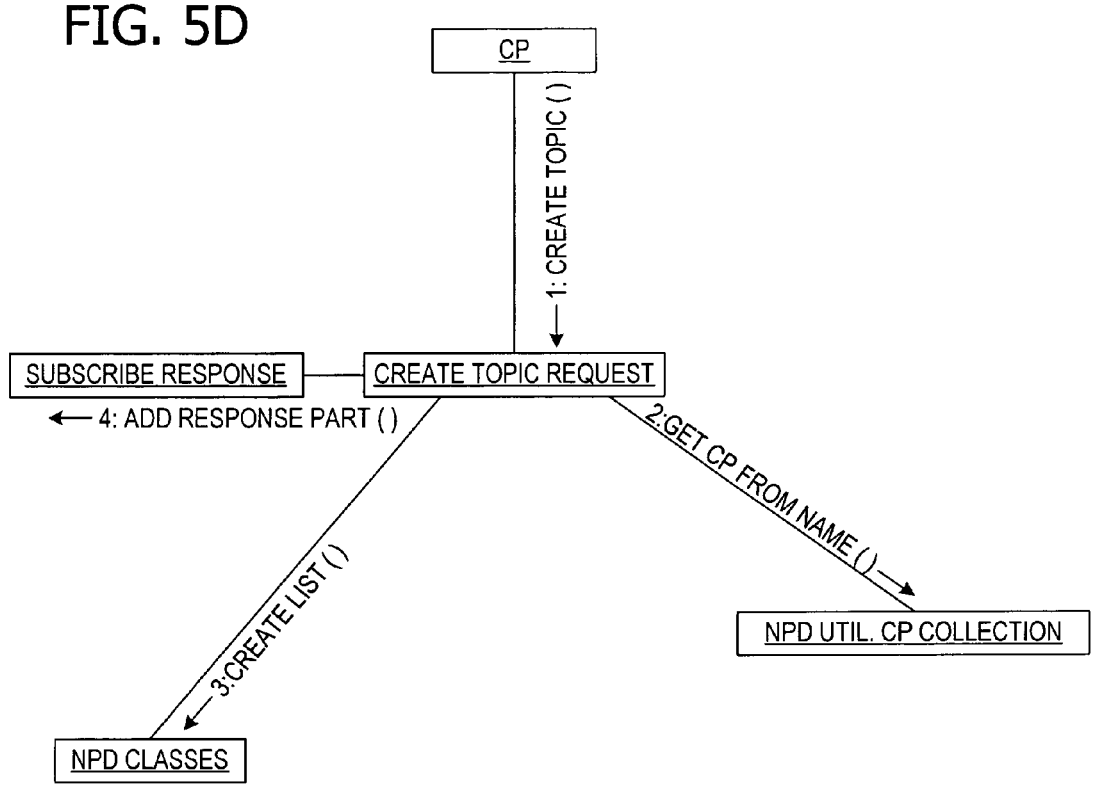

FIG. 5D is an exemplary flow diagram of a selected management function of creating a topic (i.e., CreateTopic). As described above, a topic is a named set of notifications concerning a certain interest among the subscribers. A topic is specified as a uniform resource locator (URL) relative to the content provider's domain, and is on the form /bl/hexadecimal_identifier, where hexadecimal_identifier is a numeric value specified in hexadecimal. A subscriber can also subscribe to content provider 102, while being agnostic about topics. In that case, the topic is specified as /. In one embodiment, the non-empty topic is a representation of a broadcast list, and an empty topic is a representation for the set of standard non-broadcast list notifications. 1) Content provider 102 posts an Create Topic Request; 2) the CPID context is retrieved; 3) the list is created; and 4) a response is created.

Figure 5E:
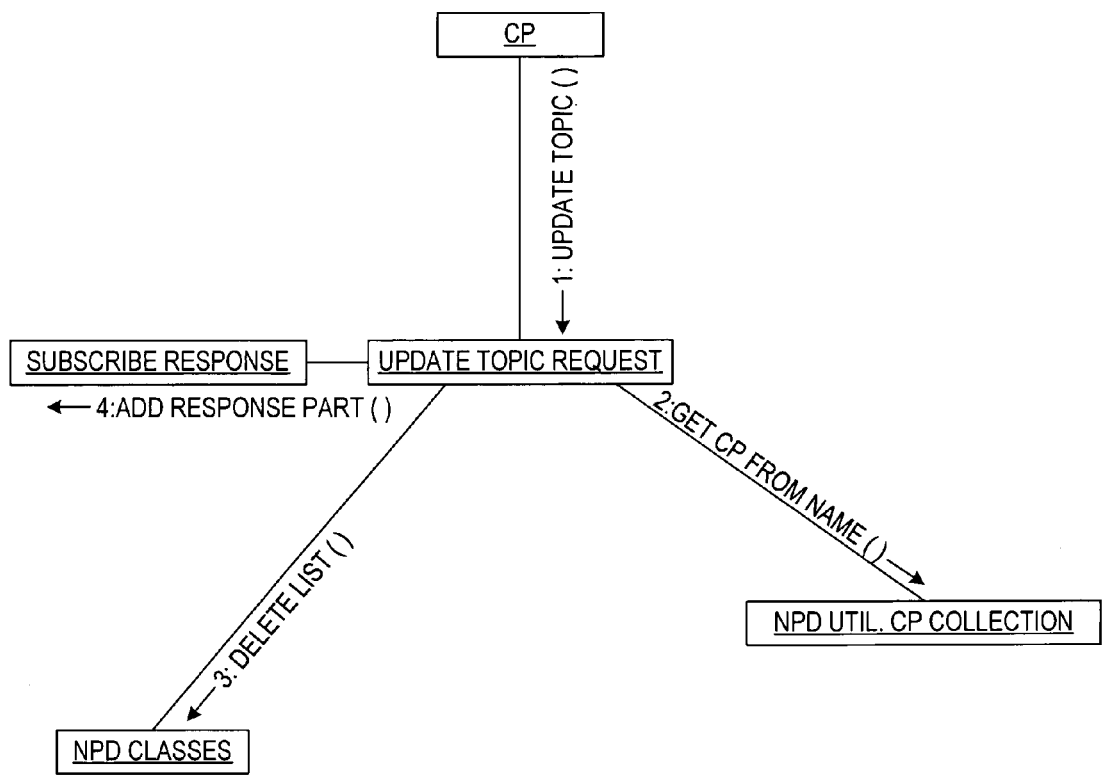

FIG. 5E is an exemplary flow diagram of a selected management function of updating a topic (i.e., UpdateTopic). 1) Content provider 102 posts an Update Topic Request; 2) the CPID context is retrieved; 3) the list is updated; and 4) a response is created.

In one embodiment of the invention, alerts service 104 provides performance monitoring with one or more of the following counters:
Subscribe Requests In Total
Subscribe Requests Per Second
Average Processing Time For Subscribe Request
Average Synchronous+Asynchronous Time For Subscribe Request
Unsubscribe Requests In Total
Unsubscribe Requests Per Second
Average Processing Time For Unsubscribe Request
CreateTopic Requests In Total
CreateTopic Requests Per Second
Average Processing Time For CreateTopic Request
UpdateTopic Requests In Total
UpdateTopic Requests Per Second
Average Processing Time For UpdateTopic Request The alerts topic management service 302 allows content providers 102 to create and update topics via SOAP message requests. Key functions include creating, updating, and enumerating topics. The service 302 may be a fully functional web service. In one embodiment, alerts service 104 provides a command line utility TopicControl to content providers 102. The command line utility permits web service requests to be made under the covers.

As described above, alerts topic management service 302 may be an ASP.NET web service, and manipulates the BLDB 312 using the assembly 310. Service 302 may be deployed with the alerts subscription management service 304 on the web front ends.

Once a request has been received, the web service 302 retrieves the CPID from the HTTP headers (placed by an authentication filter DLL, for example). The topic ID will be extracted from the SOAP message. Each request is handled differently depending on the type of request. During the processing of the request, an object derived from Response is built. This is then sent back to content provider 102 as the response. The different requests are described below:

CreateTopic: 1) Content provider 102 makes a CreateTopic request to the alerts topic management service 302; 2) alerts topic management service 302 extracts request information, namely, CPID from HTTP header; 3) service 302 creates a CreateTopicResponse object; and 4) for each <Topic> in <CreateTopic>; 4) alerts topic management service 302 extracts the topic information (e.g., topic ID, name, and language from SOAP message); Set information (from 4a) in npdBroadcastList object, c) Create topic, and d) Call CreateTopicResponse.GetResponsePart( ) with the results; and 5) Return CreateTopicResponse back to content provider 102.

UpdateTopic: 1) Content provider 102 makes an UpdateTopic request to the alerts topic management service 302; 2) alerts topic management service 302 extracts request information, a) CPID from HTTP header; and 3) creates an UpdateTopicResponse object. 4) For each <To> in <Target>, service 302 extracts the topic information, including Topic ID, from the SOAP message, and calls UpdateTopicResponse.GetResponsePart( ) with the results; and 5) returns UpdateTopicResponse back to content provider 102.

In one embodiment of the invention, alerts service 104 provides performance monitoring with one or more of the following counters:
CreateTopic Requests In Total
CreateTopic Requests Per Second
Successful CreateTopic Requests In Total
Successful CreateTopic Requests Per Second
Failed CreateTopic Requests In Total
Failed CreateTopic Requests Per Second
UpdateTopic Requests In Total
UpdateTopic Requests Per Second
Successful UpdateTopic Requests In Total
Successful UpdateTopic Requests Per Second
Failed UpdateTopic Requests In Total
Failed UpdateTopic Requests Per Second
EnumerateTopic Requests In Total
EnumerateTopic Requests Per Second
Successful EnumerateTopic Requests In Total
Successful EnumerateTopic Requests Per Second
Failed EnumerateTopic Requests In Total
Failed EnumerateTopic Requests Per Second FIG. 6 shows one example of a general purpose computing device in the form of a computer 70. In one embodiment of the invention, a computer such as the computer 70 is suitable for use in alerts service 104.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that may be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during start-up, is typically stored in ROM 78. The RAM 80 typically contains data and/or program modules that are immediately accessible to and/or presently being operated on by processing unit 72. By way of example, and not limitation, FIG. 6 illustrates operating system 84, application programs 86, other program modules 88, and program data 90.

The computer 70 may also include other removable/non-removable, volatile/nonvolatile computer storage media. For example, FIG. 6 illustrates a hard disk drive 94 that reads from or writes to non-removable, nonvolatile magnetic media. FIG. 6 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 84, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 6, provide storage of computer readable instructions, data structures, program modules and other data for the computer 70. In FIG. 6, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 6 include a local area network (LAN) 136 and a wide area network (WAN) 138, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 134, or other appropriate mechanism. In a networked environment, program modules depicted relative to computer 70, or portions thereof, may be stored in a remote memory storage device (not shown). By way of example, and not limitation, FIG. 6 illustrates remote application programs 144 as residing on the memory device. The network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 70 executes computer-executable instructions such as those described herein for implementing a web service responsive to requests structured according to an extensible messaging framework (e.g., SOAP). The web service implemented by computer 70 receives a request from content provider 102 that specifies a selected notification management function. In this instance, the request is structured according to the messaging framework. Computer 70 further executes computer-executable instructions to extract request information, including at least a content provider identifier and a topic identifier, from the request and to execute the selected notification management function based on the extracted request information.

The order of execution or performance of the methods illustrated and described herein is not essential, unless otherwise specified. That is, elements of the methods may be performed in any order, unless otherwise specified, and that the methods may include more or less elements than those disclosed herein.

Information in this document, including uniform resource locator and other Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A web-based system for processing notifications, said notifications containing content provided by one or more content providers to subscribed users, said content relating to one or more topics, said system comprising:

a computing device to execute a web service on a web server, said web service responsive to notifications requests structured according to an extensible messaging framework, wherein the extensible messaging framework comprises a Simple Object Access Protocol (SOAP), said web service being accessible via a hypertext transport protocol (HTTP), said computing device being coupled to a data communication network and configured to receive notifications requests from a plurality of content providers via the data communication network, said received notifications requests from the plurality of content providers specifying a selected notification management function related to managing subscriptions, said received notifications request being structured according to the extensible messaging framework, wherein the received notifications request comprises a SOAP request, each content provider being associated with a plurality of subscriptions, each subscription being associated with one content provider;

a computer-readable storage medium storing computer-executable instructions to be executed on the computing device to extract request information from the plurality of notifications requests, said request information including a content provider identifier, a user identifier to identify the user, and a topic identifier associated with the notifications request, said topic identifier being associated with a corresponding relative uniform resource locator (URL), wherein the relative URL is relative to the web domain of the content provider, such that the web domain of the content provider and the relative URL indicate an absolute URL in the form "//<web domain of content provider><relative URL>", wherein said corresponding relative URL corresponds to one or more topics, and to perform the selected notification management function based on the extracted request information, wherein the selected notification management function is related to the management of subscriptions associated with the content provider corresponding to the content provider identifier and the topic identifier; and a memory associated with the computing device to store the extracted request information in connection with the selected notification management function.

2. The system of claim 1, wherein the request includes a header and the content provider identifier is extracted from the header.

3. The system of claim 1, wherein the computer-readable storage medium further stores computer-executable instructions to be executed on the computing device to create a response object in response to said received request, said response object being structured according to the messaging framework, said response object containing information relating to either success or failure of the request.

4. The system of claim 1, wherein the selected notification management function comprises one of the following: creating one or more topics; deleting one or more topics; updating one or more topics; and enumerating one or more topics.

5. The system of claim 1, wherein the selected notification management function comprises subscribing the identified user to one or more topics corresponding to the topic identifier specified by the extracted request information, said identified user to receive at least one notification relating to the one or more topics when subscribed thereto, said notification including content related to said subscribed one or more topics.

6. The system of claim 1, wherein the selected notification management function comprises unsubscribing the identified user to one or more topics corresponding to the topic identifier specified by the extracted request information, said identified user to no longer receive notifications relating to the one or more topics when unsubscribed thereto.

7. A method of managing notifications in a web-based notifications system, said notifications system being configured to provide notifications to a user via a data communication network, said notifications containing content provided by one or more content providers, said content relating to one or more topics, said method comprising:

executing a web service on a web server, said web service responsive to notifications requests structured according to an extensible messaging framework comprising a Simple Object Access Protocol (SOAP), said web service being accessible via a hypertext transport protocol (HTTP);

receiving, via HTTP at the web service, a notifications request from a content provider, said received notifications request specifying a selected notification management function, said received notifications request being structured according to the extensible messaging framework, said received notifications request comprising a SOAP request;

extracting request information from the received notifications request, said request information including at least a content provider identifier, a user identifier to identify the user, and a plurality of topic identifiers, each said topic identifier being associated with a corresponding relative uniform resource locator (URL), wherein the relative URL is relative to the web domain of the content provider, such that the web domain of the content provider and the relative URL indicate an absolute URL in the form "//<web domain of content provider><relative URL>", wherein said corresponding relative URL corresponds to one or more topics;

executing the selected notification management function based on the extracted request information for each of the plurality of topic identifiers; and sending a response object to the content provider via HTTP, said response object being structured according to the extensible messaging framework, said response object containing information relating to either success or failure for the executed selected notification management function including the performed function for each of the plurality of topic identifiers.

8. The method of claim 7, wherein the request includes a header and wherein extracting request information comprises extracting the content provider identifier from the header.

9. The method of claim 7, further comprising sending the response object to the content provider via the data communication network.

10. The method of claim 7, further comprising providing a command line utility configured for use by the content provider to structure the request according to the extensible messaging framework.

11. The method of claim 7, wherein executing the selected notification management function comprises performing a function corresponding to the topic identifier specified by the extracted request information selected from the group consisting of: creating one or more topics; deleting one or more topics; updating one or more topics; and enumerating one or more topics.

12. The method of claim 7, wherein executing the selected notification management function comprises subscribing the identified user to one or more topics corresponding to the topic identifier specified by the extracted request information, said identified user to receive at least one notification via the web-based notifications system relating to the one or more topics when subscribed thereto.

13. The method of claim 12, wherein subscribing the identified user comprises:

querying a user profile store for profile information corresponding to the identified user;

determining routing information for the notification based on the profile information;

creating a subscription corresponding to the topic identifier, said subscription including the topic identifier, the user identifier, and the routing path for the notification; and creating a response object in response to said received request, said response object being structured according to the messaging framework, said response object containing information identifying the created subscription; and sending the response object to the content provider via the data communication network.

14. The method of claim 7, wherein executing the selected notification management function comprises unsubscribing the identified user to one or more topics corresponding to the topic identifier specified by the extracted request information, said identified user to no longer receive notifications via the web-based notifications system relating to the one or more topics when unsubscribed thereto.

15. The method of claim 7, wherein executing the selected notification management function comprises updating one or more subscriptions based on the user identifier and the topic identifier specified by the extracted request information.

16. One or more computer-readable storage media having computer-executable instructions for performing the method of claim 7.

17. A web service for managing notifications in a web-based notifications system, said notifications system being configured to provide notifications to a user via a data communication network, said notifications containing content provided by one or more content providers, said content relating to one or more topics, said web service comprising:
 a computing device to execute the web service on a web server, said web service being accessible via a hypertext transport protocol (HTTP), said computing device being coupled to the data communication network and configured to receive notifications requests structured according to an extensible messaging framework, wherein the extensible messaging framework comprises a Simple Object Access Protocol (SOAP) and wherein the received notifications requests comprise SOAP requests, from one or more content providers via the data communication network; and
 a computer-readable storage medium storing computer-executable instructions to be executed on the computing device to:
  provide the extensible messaging framework to the content providers to create requests, said requests when structured according to the messaging framework each specify a selected notification management function and contain request information, said request information for each of the requests including a content provider identifier and a plurality of topic identifiers associated therewith, each said topic identifier being associated with a corresponding relative uniform resource locator (URL), wherein the relative URL is relative to the web domain of the content provider, such that the web domain of the content provider and the relative URL indicate an absolute URL in the form "//<web domain of content provider><relative URL>", wherein said corresponding relative URL corresponds to one or more topics;
  extract the request information for each of the requests, said request information including a content provider identifier, a topic identifier, and a user identifier associated with the request, said user identifier identifying the user;
  perform the selected notification management function based on the extracted request information; and
  create a response object in response to said received request, said response object each being structured according to the messaging framework and containing information relating to either success or failure of the performed notification management functions for each of the plurality of topic identifiers.

18. The web service of claim 17, wherein the selected notification management function comprises is selected from the following group: creating one or more topics; deleting one or more topics; enumerating one or more topics; creating a subscription; deleting a subscription; updating a subscription; and enumerating subscriptions.

19. A method of managing notifications in a web-based notifications system, said notifications system being configured to provide notifications to a user via a data communication network, said notifications containing content provided by one or more content providers, said content relating to one or more topics, said method comprising:
 executing a web service on a web server, said web service responsive to requests structured according to an extensible messaging framework comprising a Simple Object Access Protocol (SOAP), said web service being accessible via a hypertext transport protocol (HTTP);
 receiving, at the web service, requests from a plurality of content provider, said received requests being structured according to the extensible messaging framework, each of said received requests comprising a SOAP request;
 extracting request information from each of the plurality of received requests, said request information including at least a content provider identifier, a topic identifier, a selected notification management function related to managing subscriptions to be performed by the notifications system, and a user identifier to identify the user, each content provider being associated with a plurality of subscriptions, each subscription being associated with one content provider;
 querying a user profile store for profile information corresponding to each of the user identifiers of the requests, said profile information including user routing preferences to indicate which one or more user devices should receive the notifications;
 querying a messaging service based on the user identifier and based on the presence of a user profile in the user profile store corresponding to each of the user identifiers of the requests for additional routing data for the delivery of notifications, said additional routing data including an opt-out status;
 determining routing information for a notification based on the profile information and based on the additional routing data for each user identifier; and
 creating a subscription for the users corresponding to the topic identifiers by executing the selected notification management function based on the extracted request information, wherein the selected notification management function is related to the management of subscriptions associated with the content provider corresponding to the content provider identifier of the request and wherein the subscription for the user includes the determined routing information corresponding to the user.

20. The method of claim 19, wherein executing the selected notification management function comprises unsubscribing the user to one or more topics corresponding to the topic identifier specified by the extracted request information, said user to no longer receive notifications via the web-based notifications system relating to the one or more topics when unsubscribed thereto.

21. The method of claim 19, further comprising creating a response object in response to said received request, said response object being structured according to the messaging framework, said response object containing information relating to either success or failure of the request.

22. The method of claim 21, wherein said response object contains information identifying the created subscription.

23. The method of claim 21, further comprising sending the response object to the content provider via the data communication network.

24. The method of claim 19, wherein the request includes a header and wherein extracting request information comprises extracting the content provider identifier from the header.

25. One or more computer-readable storage media having computer-executable instructions for performing the method of claim 19.

26. A web-based system for processing notifications, said notifications containing content provided by one or more content providers, said content relating to one or more topics, said system comprising:

a computing device to execute a web service on a web server, said web service responsive to notifications requests structured according to an extensible messaging framework, wherein the extensible messaging framework comprises a Simple Object Access Protocol (SOAP), said web service being accessible via a hypertext transport protocol (HTTP), said computing device being coupled to a data communication network and configured to receive a notifications request from a content provider via the data communication network, said received notifications request being structured according to the extensible messaging framework, wherein the received notifications request comprises a SOAP request;

a user profile store associated with the computing device to store profile information representative of a plurality of users, said profile information including user routing preferences to indicate which one or more user devices should receive the notifications; and a computer-readable storage medium storing computer-executable instructions to be executed on the computing device to:

extract request information from the request, said request information including a content provider identifier, a topic identifier, and a user identifier associated with the request, said user identifier identifying the user, query the user profile store for profile information corresponding to the user identifier, query a messaging service based on the user identifier and based on the presence of a user profile in the user profile store corresponding to the user identifier of the request for additional routing data, said additional routing data indicating an opt-out status, determine routing information for a notification based on the profile information and the additional routing data, and create a subscription corresponding to the topic identifier, the user identifier, and the routing path for the notification, wherein the subscribed user associated with the user identifier receives at least one notification containing content provided the content provider via the routing path, the content being related to said subscribed one or more topics associated with the topic identifier, the topic identifier being associated with a corresponding relative uniform resource locator (URL), wherein the relative URL is relative to the web domain of the content provider, such that the web domain of the content provider and the relative URL indicate an absolute URL in the form "//<web domain of content provider><relative URL>", wherein said corresponding relative URL corresponds to one or more topics.

27. The system of claim 26, wherein said request information extracted from the request further specifies a selected notification management function to be performed by the system, and wherein the computer-readable storage medium further stores computer-executable instructions to be executed on the computing device to perform the selected notification management function based on the extracted request information.

28. The system of claim 27, wherein the selected notification management function is selected from the following group: creating one or more topics; deleting one or more topics; enumerating one or more topics; creating a subscription; deleting a subscription; updating a subscription; and enumerating subscriptions.

29. The system of claim 26, wherein the computer-readable storage medium further stores computer-executable instructions to be executed on the computing device to create a response object in response to said received request, said response object being structured according to the messaging framework, said response object containing information relating to either success or failure of the request, and wherein the computing device is configured to send the response object to the content provider in response to the request received therefrom.

* * * * *